United States Patent
Martinez

(10) Patent No.: US 12,451,692 B2
(45) Date of Patent: *Oct. 21, 2025

(54) DECENTRALIZED HARDWARE-IN-THE-LOOP SCHEME

(71) Applicant: Heila Technologies, Inc., Somerville, MA (US)

(72) Inventor: Jorge Elizondo Martinez, Somerville, MA (US)

(73) Assignee: Discovery Energy, LLC, Kohler, WI (US)

( * ) Notice: Subject to any disclaimer, the term of this patent is extended or adjusted under 35 U.S.C. 154(b) by 138 days.

This patent is subject to a terminal disclaimer.

(21) Appl. No.: 18/120,641

(22) Filed: Mar. 13, 2023

(65) Prior Publication Data
US 2023/0216299 A1 Jul. 6, 2023

Related U.S. Application Data

(63) Continuation of application No. 17/191,049, filed on Mar. 3, 2021, now Pat. No. 11,616,365, which is a
(Continued)

(51) Int. Cl.
*H02J 3/06* (2006.01)
*H02J 3/00* (2006.01)
(Continued)

(52) U.S. Cl.
CPC ...... *H02J 3/06* (2013.01); *H02J 3/14* (2013.01); *H02J 3/16* (2013.01); *H02J 3/381* (2013.01);
(Continued)

(58) Field of Classification Search
CPC ...... H02J 3/14; H02J 3/06; H02J 3/381; H02J 3/003; H02J 2310/64; H02J 2300/40;
(Continued)

(56) References Cited

U.S. PATENT DOCUMENTS 7,167,817 B2   1/2007   Mosterman et al.
9,063,525 B2   6/2015   Sanders et al.
(Continued)

FOREIGN PATENT DOCUMENTS

CN   107679776 A   2/2018
CN   108306292 A   7/2018
(Continued)

OTHER PUBLICATIONS

Extended European Search Report for European Patent Application No. 18842360.2, dated Dec. 22, 2020 (6 pages).
(Continued)

*Primary Examiner* — Ziaul Karim
(74) *Attorney, Agent, or Firm* — The Belles Group, P.C

(57) ABSTRACT

A method tests the configuration of an aggregated DERs system using distributed asset managers in a decentralized hardware-in-the-loop ("HIL") scheme. The managers contain the model of the asset they are meant to control. The method programs an asset manager with a model of a DERs asset. A plurality of asset managers are connected to a central controller. The plurality of asset managers are also connected to a simplified hardware-in-the-loop platform. The simplified HIL platform is configured to solve a network model, a load model, a non-controllable asset model, and a grid model. The method tests the DERs system control structure by using: (a) the simplified HIL platform to solve the network model, the load model, the non-controllable asset model, and the grid model, and (b) the asset manager to solve the model of the DERs asset, without any simulation between the central controller and the distributed asset managers.

10 Claims, 4 Drawing Sheets

Related U.S. Application Data continuation of application No. 16/683,148, filed on Nov. 13, 2019, now Pat. No. 10,971,931.

(60) Provisional application No. 62/760,823, filed on Nov. 13, 2018.

(51) Int. Cl.
*H02J 3/14* (2006.01)
*H02J 3/16* (2006.01)
*H02J 3/38* (2006.01)

(52) U.S. Cl.
CPC ........... *H02J 3/003* (2020.01); *H02J 2203/10* (2020.01); *H02J 2310/64* (2020.01)

(58) Field of Classification Search
CPC ..... H02J 2203/10; H02J 3/16; Y02B 70/3225; Y02E 40/30; Y04S 20/222; Y02P 70/10; Y02P 90/02
See application file for complete search history.

(56) References Cited

U.S. PATENT DOCUMENTS

| | | | |
|---|---|---|---|
| 9,300,137 | B2 | 3/2016 | Cherian et al. |
| 9,417,276 | B1 | 8/2016 | Tatcho et al. |
| 9,500,717 | B1 | 11/2016 | Salmani et al. |
| 9,762,060 | B2* | 9/2017 | Kalsi .................. H02J 3/00 |
| 9,886,014 | B2 | 2/2018 | Yoo et al. |
| 10,061,283 | B2 | 8/2018 | Wong et al. |
| 10,892,638 | B2 | 1/2021 | Martinez et al. |
| 10,903,650 | B2 | 1/2021 | Martinez et al. |
| 10,971,931 | B2 | 4/2021 | Martinez |
| 11,451,088 | B2 | 9/2022 | Martinez et al. |
| 11,616,365 | B2 | 3/2023 | Martinez |
| 11,664,678 | B2 | 5/2023 | Martinez et al. |
| 2006/0047369 | A1 | 3/2006 | Brewster et al. |
| 2007/0124026 | A1 | 5/2007 | Troxell et al. |
| 2008/0074284 | A1 | 3/2008 | Edwards et al. |
| 2008/0120216 | A1 | 5/2008 | Saigh et al. |
| 2008/0168092 | A1 | 7/2008 | Boggs et al. |
| 2008/0243713 | A1 | 10/2008 | Chiulli et al. |
| 2009/0157835 | A1 | 6/2009 | Thompson et al. |
| 2010/0207456 | A1 | 8/2010 | Lasseter et al. |
| 2011/0035073 | A1 | 2/2011 | Ozog |
| 2011/0093127 | A1 | 4/2011 | Kaplan |
| 2012/0005505 | A1* | 1/2012 | Tolia ..................... G06F 1/3203 713/320 |
| 2012/0047060 | A1 | 2/2012 | Fossler, II |
| 2012/0239215 | A1 | 9/2012 | Timbus et al. |
| 2012/0271470 | A1 | 10/2012 | Flynn et al. |
| 2013/0166084 | A1 | 6/2013 | Sedighy et al. |
| 2013/0226360 | A1 | 8/2013 | Wilkins et al. |
| 2013/0338843 | A1 | 12/2013 | Iravani et al. |
| 2014/0306533 | A1 | 10/2014 | Paquin et al. |
| 2015/0067356 | A1 | 3/2015 | Trichy Ravi et al. |
| 2015/0134130 | A1 | 5/2015 | Carralero et al. |
| 2015/0277406 | A1* | 10/2015 | Maturana ................ G06F 9/451 700/83 |
| 2015/0309829 | A1 | 10/2015 | Hiltgen et al. |
| 2016/0109895 | A1 | 4/2016 | Schindler |
| 2016/0117657 | A1 | 4/2016 | Forbes, Jr. et al. |
| 2016/0180474 | A1 | 6/2016 | Steven et al. |
| 2016/0190805 | A1 | 6/2016 | Steven et al. |
| 2016/0197476 | A1 | 7/2016 | Stewart |
| 2016/0363948 | A1 | 12/2016 | Steven et al. |
| 2017/0103468 | A1 | 4/2017 | Orsini et al. |
| 2017/0243305 | A1 | 8/2017 | Yoo et al. |
| 2018/0075548 | A1 | 3/2018 | Madonna et al. |
| 2018/0088616 | A1 | 3/2018 | Aggarwal et al. |
| 2018/0115160 | A1 | 4/2018 | Tuladhar et al. |
| 2018/0262010 | A1 | 9/2018 | Kato et al. |
| 2018/0269687 | A1 | 9/2018 | Ghaemi et al. |
| 2018/0366978 | A1 | 12/2018 | Matan et al. |
| 2019/0033801 | A1 | 1/2019 | Baone et al. |
| 2019/0036339 | A1 | 1/2019 | Wong et al. |
| 2019/0044333 | A1 | 2/2019 | Martinez et al. |
| 2019/0044378 | A1* | 2/2019 | Martinez ............ H02J 13/00009 |
| 2019/0109895 | A1 | 4/2019 | Power et al. |
| 2019/0158314 | A1 | 5/2019 | Choi et al. |
| 2019/0173286 | A1 | 6/2019 | Ilic et al. |
| 2019/0195526 | A1 | 6/2019 | Drees et al. |
| 2019/0392534 | A1 | 12/2019 | Takeuchi et al. |
| 2020/0083713 | A1 | 3/2020 | Dall'Anese et al. |
| 2020/0153246 | A1 | 5/2020 | Martinez |
| 2020/0175617 | A1 | 6/2020 | Martinez |
| 2021/0175744 | A1 | 6/2021 | Martinez et al. |
| 2022/0215486 | A1 | 7/2022 | Martinez et al. |
| 2023/0275456 | A1 | 8/2023 | Martinez et al. |
| 2024/0078617 | A1* | 3/2024 | Winand ............ H02J 13/00007 |

FOREIGN PATENT DOCUMENTS

| | | | |
|---|---|---|---|
| EP | 3002848 | A1 | 4/2016 |
| JP | 2005-130550 | A | 5/2005 |
| JP | 2014-505457 | A | 2/2014 |
| JP | 2018-514850 | A | 6/2018 |
| KR | 1020150117085 | A | 10/2015 |
| KR | 1020170028699 | A | 3/2017 |
| WO | 2016200398 | A1 | 12/2016 |
| WO | 2019141511 | A1 | 7/2019 |

OTHER PUBLICATIONS

International Searching Authority—International Search Report and Written Opinion for International Patent Application No. PCT/US2019/061321, mailed Mar. 10, 2020 (16 pages).

International Searching Authority—International Search Report and Written Opinion for International Patent Application PCT/US2018/045176, mailed Oct. 16, 2018, 13 pages.

International Searching Authority—International Search Report and Written Opinion for International Patent Application PCT/US2018/045275, mailed Oct. 19, 2018, 19 pages.

International Searching Authority—International Search Report and Written Opinion for International Patent Application PCT/US2018/064332, mailed Feb. 19, 2020, 15 pages.

Ruggeri S., "Centralised and decentralised control of active distribution systems: models, algorithms and applications", 2014, 102 pages. [Retrieved from the internet Jan. 29, 2020, 86 pages https://pdrs.semanticscholar.org/d898/fec6fae3729b603b74c0d24576bd53ebc784.pdf?] entire document.

Hledik R., et al., "Distribution System Pricing with Distributed Energy Resources," Future Electric Utility Regulation, Report No. 4, May 2016, 103 pages.

Wang et al., "Frequency-adaptive grid-virtual-flux synchronization by multiple second-order generalized integrators under distorted grid conditions", Turkish Journal of Electrical Engineering and Computer Sciences, vol. 23, Issue 6, Jul. 9, 2015, pp. 1930-1945. [Retrieved from the internet Jan. 29, 2020, http://journals.tubitak.gov.tr/elektrik/issues/elk-15-23-6/elk-23-6-29-1404-265.pdf] entire document.

Notice of Reasons for Refusal for Japanese Patent Application No. 2021-531875, dated Oct. 24, 2023, 7 pages.

* cited by examiner

DECENTRALIZED HARDWARE-IN-THE-LOOP SCHEME

CROSS-REFERENCE TO RELATED APPLICATIONS

This patent application is a continuation of U.S. patent application Ser. No. 17/191,049, filed Mar. 3, 2021, which is a continuation of U.S. patent application Ser. No. 16/683,148, filed Nov. 13, 2019, now U.S. Pat. No. 10,971,931, which claims priority from provisional U.S. patent application number 62/760,823, filed Nov. 13, 2018, entitled, "DECENTRALIZED HARDWARE-IN-THE-LOOP SCHEME," and naming Jorge Elizondo Martinez as inventor, the disclosures of which are incorporated herein, in their entireties, by reference.

FIELD OF THE INVENTION

Illustrative embodiments generally relate to power distribution networks and, more particularly, illustrative embodiments relate to devices for simulating power distribution across a power network.

BACKGROUND OF THE INVENTION

The electricity grid connects homes, businesses, and other buildings to central power sources. This interconnectedness requires centralized control and planning, where grid vulnerabilities can cascade quickly across the network. To mitigate these risks, aggregated distributed energy resources ("DERs") systems ("DERs Systems"), such as microgrids are becoming a popular solution. Microgrids include controlled clusters of electricity generation and storage equipment, as well as loads that provide a coordinated response to a utility need and can also operate disconnected from the main grid. This increases the power system efficiency and reliability.

The US Department of Energy provides a formal definition of a microgrid as a group of interconnected assets, including loads and distributed energy resources, with clearly defined electrical boundaries that acts as a single controllable entity with respect to the grid. A microgrid often has distributed generators (e.g., diesel generators, gas turbines, etc.), batteries, as well as renewable resources like solar panels or wind turbines.

SUMMARY OF VARIOUS EMBODIMENTS

In accordance with one embodiment of the invention, a method tests the configuration of an aggregated distributed energy resources system ("DERs system") using distributed asset managers in a decentralized hardware-in-the-loop scheme. The asset managers contain the model of the asset they are meant to control. The method programs an asset manager with a model of a DERs asset. A plurality of distributed asset managers are connected to a central controller. The plurality of distributed asset managers are also connected to a simplified hardware-in-the-loop platform ("simplified HIL platform"). The simplified HIL platform is configured to solve a network model, a load model, a non-controllable asset model, and a grid model. The method tests the DERs system control structure by using: (a) the simplified HIL platform to solve the network model, the load model, the non-controllable asset model, and the grid model, and (b) the asset manager to solve the model of the DERs asset, without any simulation between the central controller and the distributed asset managers.

Among other things, the method may calculate the DQ voltages at each node on the simplified HIL platform. The DQ voltages may be sent to the respective distributed asset managers. Additionally, the method may calculate the respective DQ currents at each distributed asset manager using their own asset model. The DQ currents may be sent to the simplified HIL platform. The method may also re-calculate the DQ voltages at each node on the simplified HIL platform. The above steps may describe a cycle. In some embodiments, the cycle may be repeated until steady state conditions are reached.

Some embodiments calculate the AC sinusoidal voltages at each node on the simplified HIL platform. The method may send the AC sinusoidal voltages to the respective distributed asset managers. The method may also calculate the respective AC sinusoidal currents at each distributed asset manager using their own asset model. The AC sinusoidal currents may be sent to the simplified HIL platform. The method may also re-calculate the three AC sinusoidal voltages at each node on the simplified HIL platform. The above steps may describe a cycle. In some embodiments, the cycle may be repeated until steady state conditions are reached.

In some embodiments, the method also calculates, in the respective distributed asset manager, the terminal voltage using the terminal current as an input for an asset operating in grid forming or master mode. Additionally, or alternatively, the method may calculate, in the respective distributed asset managers, the voltage and the frequency using the current as an input when all the assets are operating in droop control mode, in which the asset managers do not communicate with a central controller.

In some embodiments, the method may use the central controller to perform the functions of the simplified HIL platform. Additionally, the model results may be sent via the same communication network that is used to control the DERs system. Illustrative embodiments may evaluate alternative control strategies when the real DERs system is running without disturbing the system operation. For example, real data acquired and processed by the distributed asset manager may be used to automatically improve the accuracy of the distributed asset manager's asset model over time.

In accordance with another embodiment, an asset manager configured to control distribution of power within an aggregated distributed energy resources system ("DERs system") having a plurality of assets. The asset manager is configured to solve a given asset model. The asset manager includes a given asset model configured to model a real asset. The asset manager also includes an interface configured to receive asset information relating to the given asset model. The interface is configured to communicate with at least one other asset manager and/or a central controller in the DERs system. Additionally, the interface is also configured to communicate with a simplified hardware-in-the-loop platform ("HIL platform"). The asset manager includes a function generator operatively coupled with the interface. The function generator is configured to produce a set point using a local cost function with the data relating to the given asset model. The local cost function represents a portion of a system cost function for the overall DERs system. The asset manager also has an asset controller operatively coupled with the function generator and the given asset model. The asset controller is configured to solve the given asset model as a function of the set point to determine a simulated operating point for the given asset. The asset controller is further configured to forward the operating point to the HIL platform via the interface.

In accordance with yet another embodiment, a method uses a simplified hardware-in-the-loop scheme. The method provides a simplified hardware-in-the-loop computer configured to solve a network model, a load model, a non-controllable asset model, and a grid model of a distributed energy resources system. The method also provides a plurality of asset models to a plurality of asset managers, respectively, and the asset managers are configured to communicate with a central controller and the computer device. Each of the plurality of asset models is solved using the respective asset manager to produce asset model data. The method also provides the asset model data from the asset manager to the simplified hardware-in-the-loop computer.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

In illustrative embodiments, a simplified hardware-in-the-loop platform runs a simulation of an electric network model that provides realistic and real-time testing for one or more simulated asset models in an aggregated distributed energy resources system ("DERs system"). Each of the asset models has an underlying mathematical representation of the behavior of a given real asset. Unlike typical HIL platforms, the simplified HIL platform does not solve the asset models. Instead, the simplified HIL platform communicates with one or more asset managers that each solve their respective asset model. Accordingly, decentralizing the solving of the asset models to the asset managers enables a decentralized simplified HL scheme. Details of illustrative embodiments are discussed below.

Figure 1:
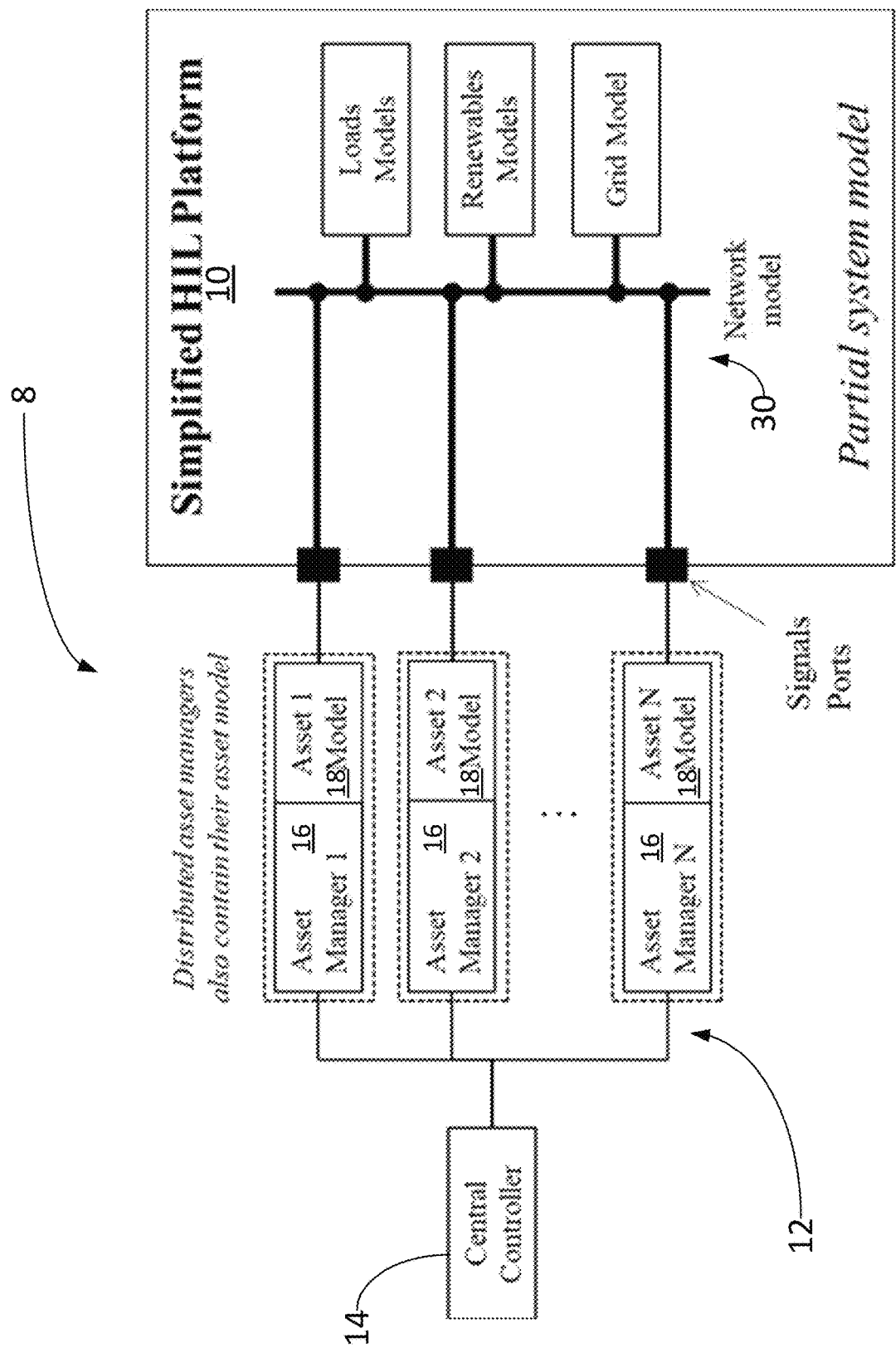
FIG. 1 schematically shows a DERs system with a simplified hardware-in-the-loop platform in accordance with illustrative embodiments of the invention.

FIG. 1 schematically shows a simplified hardware-in-the-loop platform 10 (the "HIL platform 10") working with a DERs system 8 in accordance with illustrative embodiments of the invention. The DERs system 8 includes an electrical network 12 that connects a plurality of assets. Like other DERs systems 8, the system 8 may have a central controller 14 that facilitates communication between the various assets. Specifically, the assets communicate with the central controller 14 through their respective asset manager 16. In illustrative embodiments, each asset manager 16 also contains an asset model 18 (also referred to as a virtual asset 18) configured to simulate the real asset. Although illustrative embodiments may include real assets in addition to asset models 18, any reference to "the asset" in the discussion below should be understood to refer to the asset model 18, as opposed to the real asset, unless the context otherwise requires.

FIG. 1 shows a plurality of the asset managers 16 each having the virtual asset 18. However, it should be understood that illustrative embodiments may have one or more asset managers 16 connected to the network 12, and each manager 18 may have one or more asset models 18. Furthermore, each asset model 18 may model a different type of asset (e.g., a battery, solar panels, wind turbine, etc.). Although not shown, illustrative embodiments may include one or more real assets connected to the network 12 in addition to the model 18.

The DERs system also includes the simplified HIL platform 10 that contains a network model 30. A typical HIL platform simulates the load models, non-controllable renewable models, network models, and asset models, among other things. For example, the central controller of the prior art may contain the HIL platform 10 and solve each of the asset models 18 in addition to the other models described previously.

In illustrative embodiments, the simplified HIL platform 10 does not simulate the assets 18. Instead, the simulation of each assets model 18 is performed by the respective asset manager 16. Accordingly, the simplified HIL platform 10 is enabled by decentralizing the simulation of the various asset models 18. Specifically, in illustrative embodiments each asset manager 16 contains and solves the model for its given virtual asset 18. It should be noted that while the central controller 14 may be part of the network 12 and may communicate with the asset manager(s) 16, the given asset 18 is simulated on the corresponding asset manager 16 (e.g., Asset Manager 1 simulates Asset Model 1, Asset Manager 2 simulates Asset Model 2, and Asset Manager 3 simulates Asset Model 3). Thus, illustrative embodiments may test the DERs system 8 without any simulation between the central controller 14 and the distributed asset managers 16.

Although the simplified HIL platform 10 is shown as being in a different device from the central controller 14 and the asset managers 16, in illustrative embodiments the simplified HIL simulation 10 may be run on the central controller 14 and/or one or more of the asset managers 16 instead of on a separate device (i.e., a computer).

Figure 2:
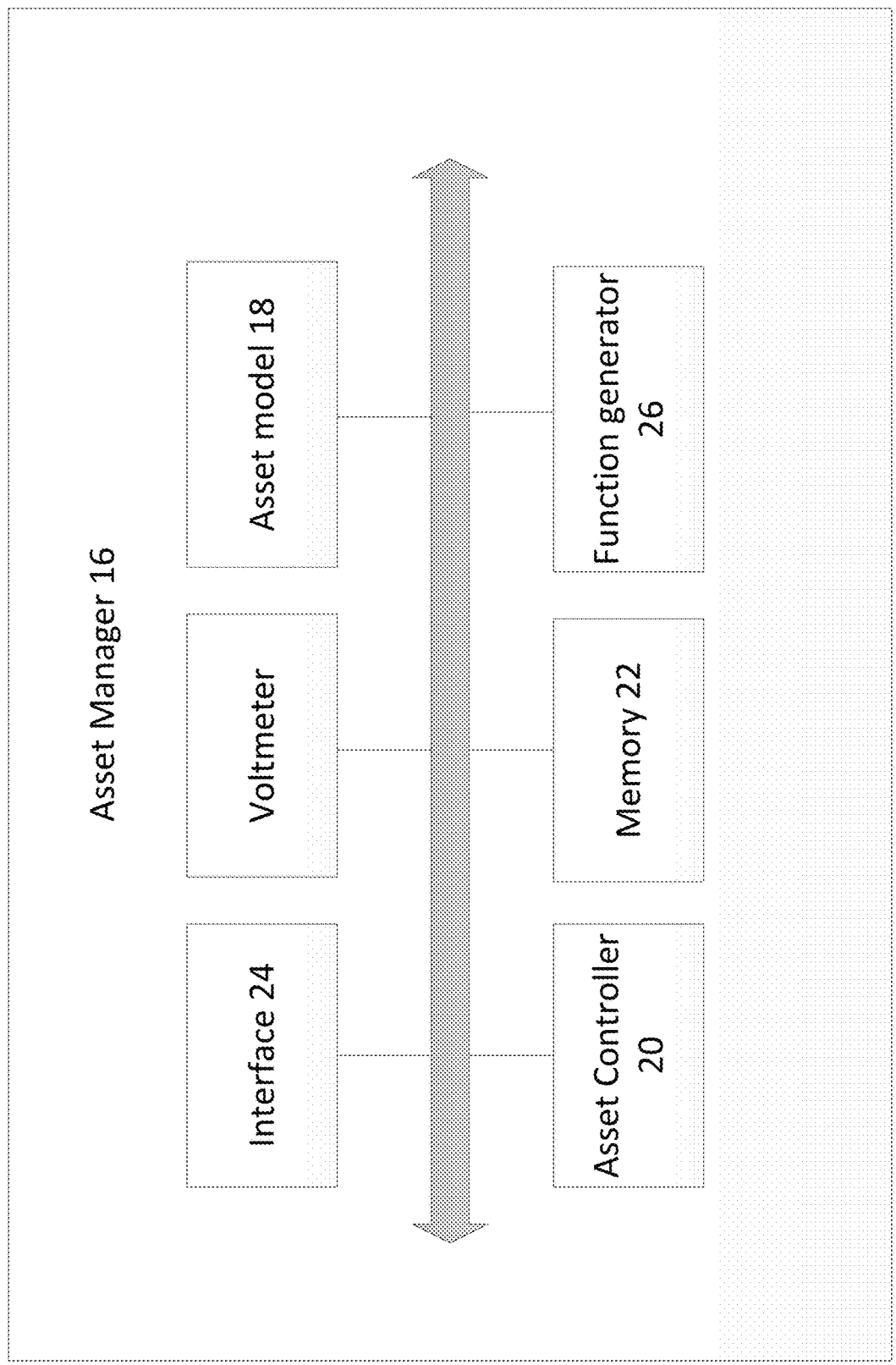
FIG. 2 schematically shows an asset manager in accordance with illustrative embodiments of the invention.

FIG. 2 schematically shows details of one of the asset managers 16 of FIG. 1 in accordance with illustrative embodiments of the invention. In illustrative embodiments, the asset manager 16 may be the same or similar to the asset manager 16 described in U.S. patent application Ser. No. 16/054,377, incorporated herein by reference in its entirety. As shown in FIG. 2, the asset manager 16 of FIG. 2 has a plurality of components that together perform some of its functions. Each of these components is operatively connected by any conventional interconnect mechanism. For example, FIG. 2 simply shows a bus communicating with each of the components. Those skilled in the art should understand that this generalized representation can be modified to include other conventional direct or indirect connections. Accordingly, discussion of a bus is not intended to limit various embodiments.

The asset manager 16 includes an asset controller 20 that is configured to, among other things, use a local cost function to manage operation of the real asset and/or asset model 18. The asset controller 20 uses the cost function to determine a set point of the real asset and/or virtual asset 18. Each asset model 18 has an independent (asset-level) cost function that the asset manager 16 maintains. Additionally, some embodiments may include a central controller 14 (external to the asset manager 16) that dynamically and efficiently updates the system-level cost function.

Each one of the asset managers 16 calculates the set point of its asset model 18. In some embodiments, the set point may be used to calculate how much current the asset injects into the system 8. However, in some other embodiments, the set point may be used to calculate how much power should be injected into the system 8. The virtual asset 18 uses the set point to change its simulated operation point (also referred to as a simulated output). The operation point is the combination of the real and reactive power that the simulated or real asset 18 is injecting into the system 8. The operation point may also include all the internal states of the simulated or real asset 18, such as temperatures, stored energy, voltages, etc.

The asset manager 16 includes a memory 22 for storing asset data, an interface 24 to communicate with the asset 18 and other devices, a function generator 26 configured to produce the local cost function, and the asset model 18 used to emulate the behavior of the asset, such as diesel generators, gas turbines, batteries, solar panels, wind turbines, loads, etc. Although the interface 24 may communicate with the asset 18 using a protocol that may be proprietary to its assigned asset, it preferably communicates with the central controller 14 and/or other asset managers 16 and/or the simplified HIL platform 10 using a communication protocol for DERs systems 8 known to those of skill in the art. Each of these components and other components cooperate to perform the various discussed functions.

In addition to the components described herein, the asset manager 16 may include other modules, such as a voltmeter, topography engine, physical characteristic analysis engine, or others, as described in U.S. application Ser. No. 16/054,377 and Ser. No. 16/054,967, both of which are incorporated herein by reference in their entireties.

Indeed, it should be noted that FIG. 2 only schematically shows each of these components. Those skilled in the art should understand that each of these components can be implemented in a variety of conventional manners, such as by using hardware, software, or a combination of hardware and software, across one or more other functional components. For example, the controller 20 may be implemented using a plurality of microprocessors executing firmware. As another example, the controller 20 may be implemented using one or more application specific integrated circuits (i.e., "ASICs") and related software, or a combination of ASICs, discrete electronic components (e.g., transistors), and microprocessors. Accordingly, the representation of the controller 20 and other components in a single box of FIG. 2 is for simplicity purposes only. In fact, in some embodiments, the controller 20 of FIG. 2 is distributed across a plurality of different machines—not necessarily within the same housing or chassis.

It should be reiterated that the representation of FIG. 2 is a significantly simplified representation of an actual asset manager 16. Those skilled in the art should understand that such a device may have many other physical and functional components, such as central processing units, communication modules, protocol translators, sensors, meters, etc. Accordingly, this discussion is in no way intended to suggest that FIG. 2 represents all the elements of an asset manager.

Figure 3:
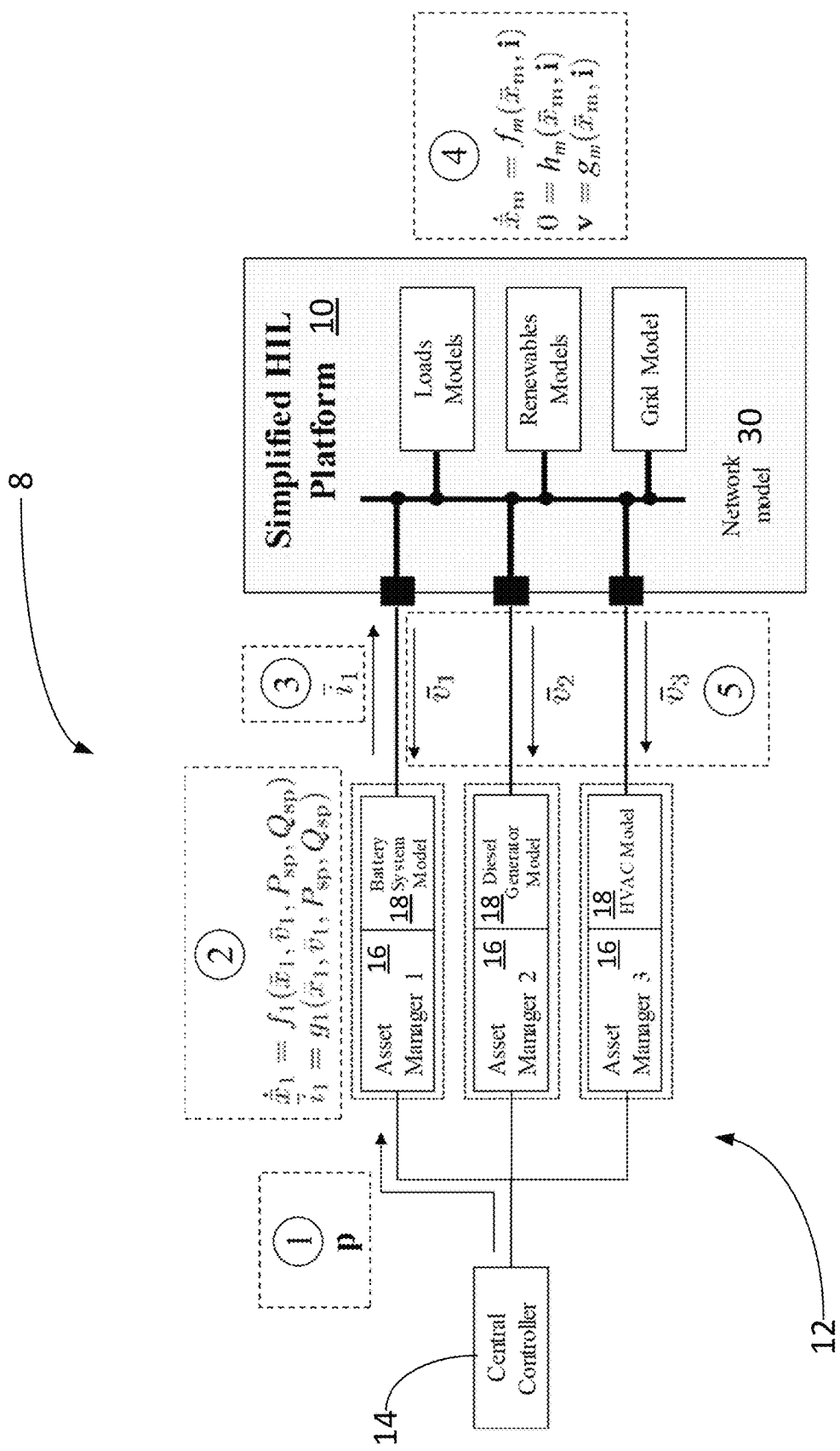
FIG. 3 schematically shows a DERs system with a simplified hardware-in-the-loop platform in accordance with illustrative embodiments of the invention.

FIG. 3 schematically shows the DERs system 8 with the simplified HIL platform 10 in accordance with illustrative embodiments. As previously described, the DERs system 8 has a plurality of the asset managers 16 each having a virtual asset model 18. As shown, the DERs system 8 in this example has three controllable virtual assets 18 (i.e., a battery system, a diesel generator, and a controllable load). Notably, illustrative embodiments use a decentralized control structure (i.e., each virtual asset 18 is equipped with its own distributed asset manager 16 used to model the respective virtual asset 18).

Although a plurality of asset managers 16 are shown, it should be understood that illustrative embodiments may operate with only a single asset manager 16. Additionally, although not shown, illustrative embodiments may include one or more asset manager 16 that controls a real asset (in addition to or instead of a virtual asset 18). Indeed, in illustrative embodiments, after the asset model 18 is tested, the asset manager 16 may be coupled with the real asset that was simulated by the asset model 18. In some embodiments, the asset manager 16 may be coupled with a real asset and include the asset model 18. For example, the real asset may be turned off to determine the adequacy of replacing the real asset with another real asset represented by the model 18.

Figure 4:
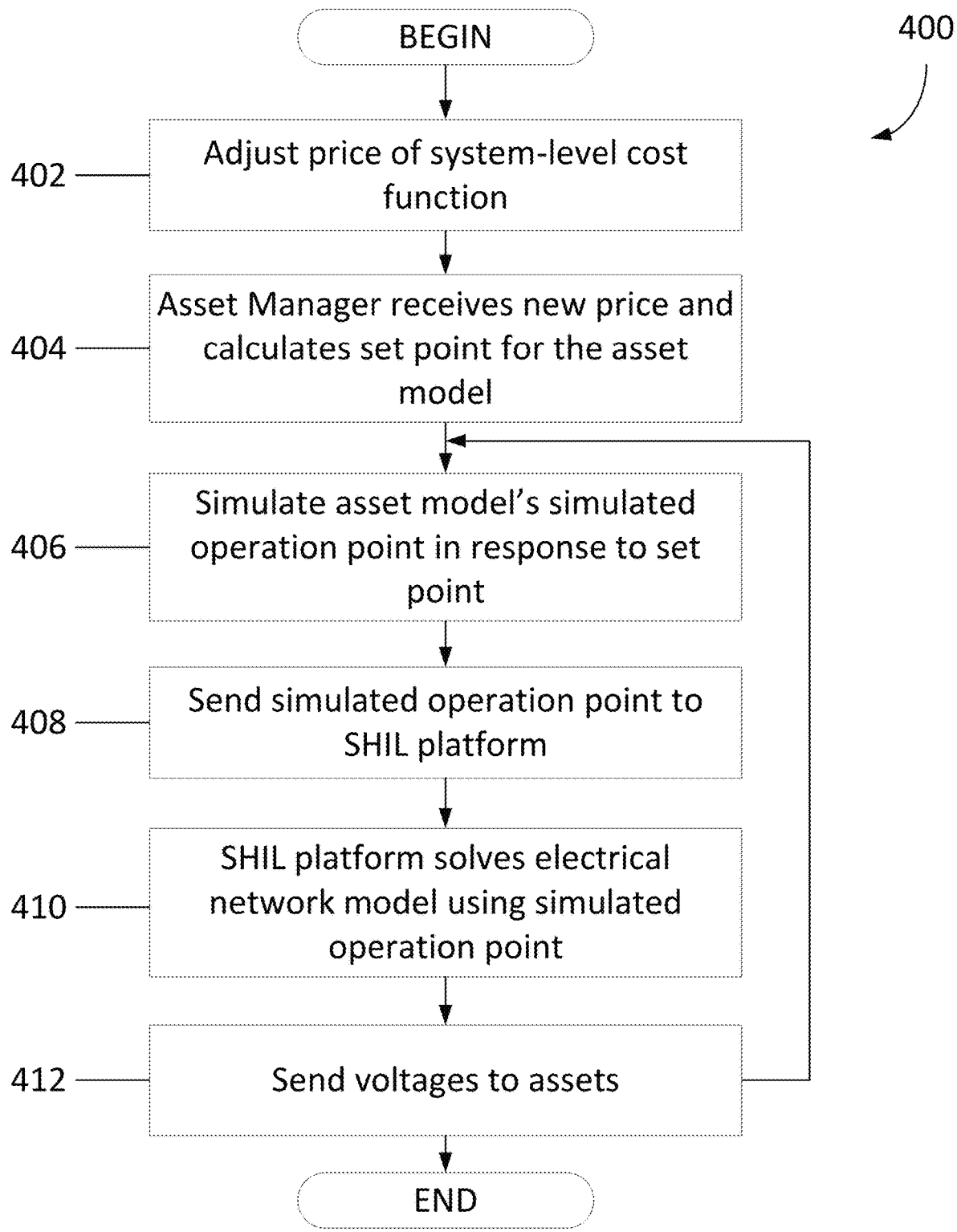
FIG. 4 schematically shows a process of implementing a change in a physical variable of the DERs system of FIG. 3.

FIG. 4 shows a process 400 of using the DERs system 8 with the simplified HIL platform 10 of FIG. 3. It should be noted that this process can be a simplified version of a more complex process of using the simplified HIL platform. As such, the process may have additional steps that are not discussed. In addition, some steps may be optional, performed in a different order, or in parallel with each other. Accordingly, discussion of this process is illustrative and not intended to limit various embodiments of the invention. Although this process is discussed with regard to asset models 18, the process of FIG. 2 can be expanded to cover processes including real assets at the same time. Thus, it should be understood that illustrative embodiments are not limited to operating with DERs systems 8 having the configuration shown in FIG. 3.

The process 400 of FIG. 4 shows the distributed asset managers 16 solving the virtual asset model 18 to match the central control commands, and the simplified HIL platform 10 solving for the terminal voltages of the virtual assets.

The process 400 begins at step 402, which adjusts the price signal p of the system-level cost function. The price signal p (or "price") is a signal that generally increases in value when there is more demand than supply of energy, and generally decreases when there is more supply than demand of energy. For the purposes of this discussion, assume that the system 8 is in a steady state or period steady state. However, it should be understood that the system 8 does not have to be in steady state in use, and that discussion thereof is intended to facilitate ease of discussion rather than to limit illustrative embodiments of the invention.

Accordingly, the price signal p may change when the central controller 14 requests additional power from the system 8. For example, the central controller 14 may request that power output of the system 8 increase from 3 kW to 6 Kw. Because there are three assets 18 in FIG. 3 (i.e., the assets managed by asset manager 1, asset manager 2, and asset manager 3, respectively) the system 8 may respond in different ways based on the optimizing the cost function. For example, the cost function may be used to determine that it is best to inject 2 kW from each asset. Alternatively, the cost function may be used to determine that 4 kW from asset 1 and 1 kW each from asset 2 and asset 3 is optimal.

Accordingly, the change in power demands causes a change an adjustment in the price of the system-level cost function.

At step 404, the asset manager 16 receives the price and calculates a set point for the asset model 18. The set point instructs the asset 18 as to how much power and/or current to inject into the system 8. FIG. 3 shows the central controller 14 sending the new price, but in other embodiments the price 1 may be sent by another of the distributed asset managers 16 or defined by a change in its terminal frequency or voltage (for example in a droop control implementation). The asset managers 16 receive the price and use their local cost function to calculate the set point for the asset 18. Thus, illustrative embodiments use local cost functions in the asset managers 17 to minimize the cost function of the overall system.

At step 406, the asset manager 16 simulates the output of the asset 18 by solving the model using the set point (e.g., Asset Model 1 solves for the battery system). By solving the model, the system 8 determines the operation point of the asset (i.e., how the model expects the asset 18 to respond to the set point). In illustrative embodiments, the asset model 18 may have the form of a differential equation as shown in FIG. 3, where $\bar{x}_1$ is a vector with the state variables that represent the dynamics of the battery-inverter system (ex. DC voltage, temperature, etc.), $\bar{v}_1$ is a vector containing the terminal voltage to the asset, $P_{sp}$ is a scalar containing the real power set-point, and $Q_{sp}$ is a scalar of the reactive power set-point.

It should be understood that while the set point represents a desired value for real and reactive power that the simulated or real asset inject into the system, the operation point represents the combination of the actual real and reactive power that the simulated or real asset is injecting into the system. Furthermore, the operation point may also include all the internal states of the DER, such as temperature, stored energy, voltages, etc. The simulated operation point is a physical variable (e.g., in this case it is current). For example, the model operation point is represented by 1, a vector containing the terminal currents going into the simplified HIL platform 10 that contains the electrical system 12 model. The operation point of the asset model 18 (e.g., the current that the battery injects to grid) is used at step 410.

At step 408, the simulated operation point is sent to the simplified HIL platform 10, for example, using the interface 24. The new output currents from the asset 18 (e.g., battery system 18) are sent to the simplified HIL platform 10. The method to send the operation point can take many forms. For example, analog signals and/or a communication protocol may be used to send the operation point to the simplified HIL platform 10.

At step 410, the simplified HIL platform 10 receives the simulated operation point (e.g., the new currents 3 shown in FIG. 3) from the asset model 18 (e.g., the battery system) and solves power flows in the network due to the simulated currents and the uncontrollable asset models 30. The model may take a differential-algebraic equation 4 ("DAE") form as shown in FIG. 3, although different models may be used in alternative embodiments. In the equations, $\bar{x}_m$ represent the state variables of the partial DERs system model, $i=\{\bar{i}_1, \bar{i}_2, \bar{i}_3\}$ is the collection of the currents from the three controllable assets 18, and the output of the model is $v=\{\bar{v}_1, \bar{v}_2, \bar{v}_3\}$, which is the collection of voltages at the terminals of the three controllable assets 18. The algebraic equation (i.e., the second line in the DAE 4 in FIG. 3) arises from Kirchhoff current law in the network.

By solving the electrical network model 30, illustrative embodiments calculate the voltage each asset 18 sees in its terminal, and/or the total combined power output of all the assets 18. Accordingly, at step 412, the new calculated voltages $\bar{v}_1$, $\bar{v}_2$, and $\bar{v}_3$ are sent to the distributed asset managers 16.

As shown in FIG. 4, after the voltages are sent to the asset managers 16, the distributed asset managers 16 may use the new voltages to generate new operation points (e.g., currents) at step 406, and then send those new currents to the simplified HIL platform at step 408. The process may then proceed to step 410, where the simplified HIL platform 10 may recalculate the voltages. The process may be repeated until a steady state conditions are reached. When steady state conditions are reached, the process comes to an end. Alternatively, the process may come to an end upon user decision (e.g., in the case where the process 400 continues to loop because the system is unstable).

It should be understood that illustrative embodiments include variations on the process 400 described above. For example, one of the assets may operate in Grid Forming or Master mode. Accordingly, the asset's model output is the terminal voltage instead of the terminal current. In that embodiment, the currents are inputs to the model. As yet another example, when all the assets are operating in droop control mode, there is no central controller. Thus, all the assets have models where the outputs are the voltage and frequency and the currents the inputs. Accordingly, it should be understood that illustrative embodiments are intended to cover a variety of embodiments and are not limited to the disclosed embodiment described with reference to FIG. 3.

In another embodiment, the central controller 14 may act as the simplified HIL platform 10 itself, and the model results may be sent via the same communication network that is used to control the DERs system.

It should be apparent that the above-described decentralized HIL scheme enables the simplified HIL platform 10 and provides a number of advantages. For example, illustrative embodiments allow the use of parallel computing. In some embodiments, the computation is distributed among a plurality of processing devices (e.g., asset managers 16) that are connected as they would otherwise be in non-simulation settings, allowing faster and more accurate solving of the asset model 18. As a further advantage, the simplified HIL platform 10 enables an easily testable modular DERs system 8. For example, adding and removing a distributed asset manager 16 automatically adds or removes the corresponding virtual asset 18 from the DERs system 8; there is no need to make any changes to the HIL platform 10.

Additional benefits provided by illustrative embodiments include improved model accuracy. In some embodiments, since each asset is modeled independently in its respective distributed asset manager 16, the model 18 may be more accurate, as real data can be used to improve the asset model 18 over time. Furthermore, the simplified HIL platform 10 may be implemented in the field after the distributed asset managers 16 have already been put in place. As an additional benefit, the HIL platform 10 may be used even when the real system 8 is running (e.g., to test alternative control strategies, without disturbing the system 8 operation). Data may also be collected to refine the asset model(s) 18. Additional advantages include that the signals between the distributed asset managers 16 and the simplified HIL platform 10 may be physical variables (e.g., voltages, currents, etc.) instead of control commands. Accordingly, illustrative embodiments make implementation easier to debug and understand.

The communication signals between the distributed asset managers 16 and the HIL platform 10 can be adapted to change the level of detail desired in the implementation. For example, in some embodiments, the simplified HIL platform 10 calculates the DQ voltages at each node and sends them to the distributed asset managers 16. The DQ voltages are the values obtained from applying the direct-quadrature-zero transformation to the sinusoidal voltages at the terminals of the asset 18. The transformation changes the values from a static reference frame, to a reference frame that is rotating at the same frequency as the sinusoids. The distributed asset managers 16 may then use their own asset model 18 to calculate and send the DQ currents to the simplified HIL platform 10. Additionally, or alternatively, the simplified HIL platform 10 may calculate the three AC sinusoidal voltages and send the calculation to the distributed asset managers 16, which then solve their respective asset models 18 to calculate and send the three AC sinusoidal currents back.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

Disclosed embodiments, or portions thereof, may be combined in ways not listed above and/or not explicitly claimed. In addition, embodiments disclosed herein may be suitably practiced, absent any element that is not specifically disclosed herein. Accordingly, the invention should not be viewed as being limited to the disclosed embodiments.

The embodiments of the invention described above are intended to be merely exemplary; numerous variations and modifications will be apparent to those skilled in the art. Such variations and modifications are intended to be within the scope of the present invention as defined by any of the appended claims.

What is claimed is:

1. A method of testing the configuration of an aggregated distributed energy resources ("DERs") system, the method comprising:
   connecting a plurality of distributed asset managers to a central controller, the plurality of distributed asset managers including an asset manager;
   programming the asset manager with a model of a DERs asset;
   connecting the plurality of distributed asset managers to a hardware-in-the-loop platform ("HIL platform"); and
   testing the DERs system control structure by:
      the asset manager solving the model of the DERs asset and, based on the model of the DERs asset, determining the operation point of the DERs asset;
      the HIL platform:
         receiving the operation point and, based on the operation point, solving a network model, a load model, a non-controllable asset model, and a grid model, each model of the HIL platform taking the form of a differential algebraic equation; and
         determining, based on the models of the simplified HIL platform, a voltage at a terminal of the DERs asset.

2. The method of testing the configuration of a DERs system of claim 1, further comprising:
   defining a cycle that includes:
      calculating direct-quadrature-zero transformation ("DQ") voltages at each node on the HIL platform;
      sending the DQ voltages to the respective distributed asset managers;
      calculating DQ currents at each distributed asset manager using their own asset model; and
      sending the DQ currents to the HIL platform.

3. The method of testing the configuration of a DERs system of claim 1, further comprising:
   defining a cycle that includes:
      calculating AC sinusoidal voltages at each node on the simplified HIL platform;
      sending the AC sinusoidal voltages to the respective distributed asset managers;
      calculating AC sinusoidal currents at each distributed asset manager using their own asset model; and
      sending the AC sinusoidal currents to the HIL platform.

4. The method of testing the configuration of a DERs system of claim 1, further comprising:
   calculating, in the respective distributed asset manager, the terminal voltage using the terminal current as an input for an asset operating in grid forming or master mode.

5. The method of testing the configuration of a DERs system of claim 1, further comprising:
   calculating, in the respective distributed asset managers, the voltage and the frequency using the current as an input when all the assets are operating in droop control mode, in which the asset managers do not communicate with a central controller.

6. The method of testing the configuration of a DERs system of claim 1, further comprising:
   using the central controller to perform the functions of the HIL platform; and
   sending the model results via the same communication network that is used to control the DERs system.

7. The method of testing the configuration of a DERs system of claim 1, further comprising:
evaluating alternative control strategies when the real DERs system is running without disturbing the system operation.

8. The method of testing the configuration of a DERs system of claim 1, further comprising:
using real data acquired and processed by the distributed asset manager to automatically improve the accuracy of the distributed asset manager's asset model over time.

9. The method of testing the configuration of a DERs system of claim 1, further comprising:
programming each of a plurality of distributed asset managers with a respective model of a DERs asset.

10. A system comprising:
a plurality of distributed asset managers including an asset manager programmed with a model of a distributed energy resources ("DERs") asset;
a central controller connecting the plurality of distributed asset managers; and
a hardware-in-the-loop platform ("HIL platform") connected to each of the plurality of distributed asset managers;
wherein the asset manager is configured to solve the model of the DERs asset and, based on the model of the DERs asset, determine the operation point of the DERs asset; and
wherein the HIL platform is configured to:
receive the operation point and, based on the operation point, solve a network model, a load model, a non-controllable asset model, and a grid model, each model of the HIL platform taking the form of a differential algebraic equation; and
determine, based on the models of the HIL platform, a voltage at a terminal of the DERs asset.

* * * * *